July 19, 1966 M. KAPLAN ETAL 3,261,279
AUTOMATIC "50" COFFEE MAKING MACHINE
Filed Sept. 3, 1963 4 Sheets-Sheet 1
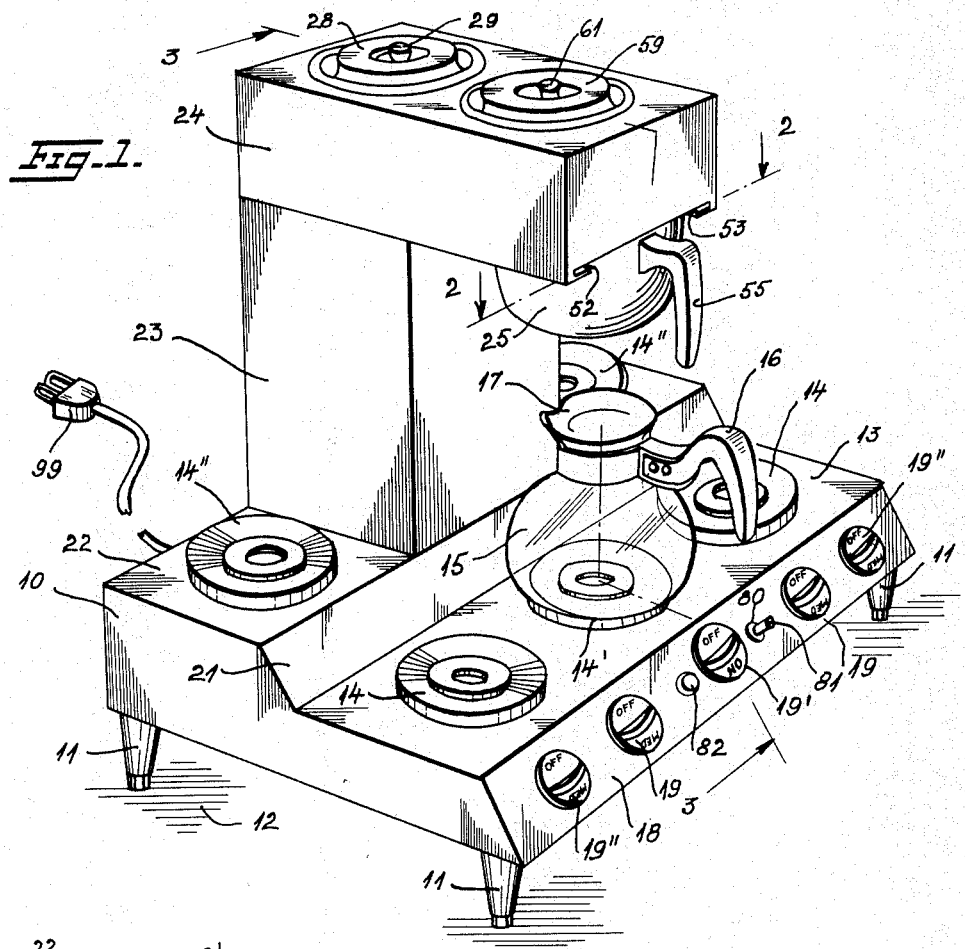
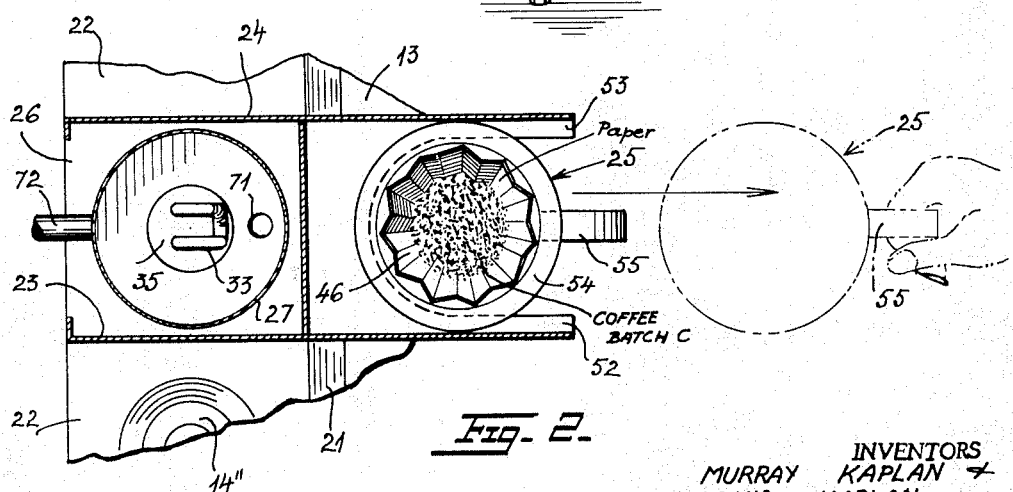
INVENTORS
MURRAY KAPLAN +
LOUIS KAPLAN
BY
Polachek & Saulsbury
ATTORNEYS.

July 19, 1966 M. KAPLAN ETAL 3,261,279
AUTOMATIC "50" COFFEE MAKING MACHINE
Filed Sept. 3, 1963 4 Sheets-Sheet 4

INVENTORS
MURRAY KAPLAN &
LOUIS KAPLAN
BY
Polachek & Saulsbury
ATTORNEYS.

United States Patent Office 3,261,279
Patented July 19, 1966

3,261,279
AUTOMATIC "50" COFFEE MAKING MACHINE
Murray Kaplan, 61 Warwick Road, and Louis Kaplan, 2 Wimbleton Lane, both of Great Neck, N.Y.
Filed Sept. 3, 1963, Ser. No. 306,102
1 Claim. (Cl. 99—282)

This invention relates to automatic coffee making machines such as are used in restaurants, hospitals, and manufacturing establishments for their employees.

It is the principal object of the present invention to provide a coffee making machine that can make in succession beaker full amounts of hot coffee from hot water constantly supplied by the machine within a tank and upon the overflow of the tank when set into operation to spray the hot water over a coffee batch placed in a filter for drainage therethrough and into the beaker underlying the hot water spray head and filter coffee batch.

It is another object of the invention to provide a coffee making machine of this type in which the water supply tank will not be under pressure and will be open at the top for easy cleaning and repair, the hot water merely flowing from the upper region of the tank by gravity through the hot water spray head overlying the coffee batch filter and the underlying beaker.

It is still another object of the invention to provide a coffee making machine of this type in which the hot water flow is automatically time-controlled and delivered in measured amounts, and in which the control mechanism for causing of the flow and preheating of the water including the maintenance of the supply of the water to the tank, is simple and yet giving all the results of a coffee making machine of the pressurized and syphon types.

It is still another object of the invention to provide an electric control system for automatic coffee making machines of this type in which the heater on which the coffee beaker is rested necessarily has to be turned on prior to the starting of the water flow from the machine in order that the coffee delivered from the machine will not be cooled by entering a cold beaker or the beaker fractured due to quick temperature change.

It is a further object of the invention to provide in a coffee making machine of this type a radiant heater surrounding the spray head and overlying the coffee batch to radiantly heat and maintain hot the water within the coffee batch filter while passing through the coffee to assure the proper mixing of the coffee with the water for best flavor, and the maximum use of the coffee batch.

Other objects of the invention are to provide a coffee making machine having the above objects in mind, which is of simple construction, has a minimum number of parts, easy to maintain and repair, of pleasing appearance, easy and safe to operate, adapted to be set up for operation from ordinary electric and water supply sources, efficient and automatic in operation.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a perspective view of the coffee making machine embodying the features of the present invention.

FIG. 2 is an enlarged fragmentary transverse sectional view of the upper portion of the machine as viewed on line 2—2 of FIG. 1, with an illustration made as to the manner in which the coffee batch filter bowl-shaped funnel is inserted and removed in the overhanging guide support of the machine and over the coffee beaker that collects the coffee supplied therefrom.

Figure 3:
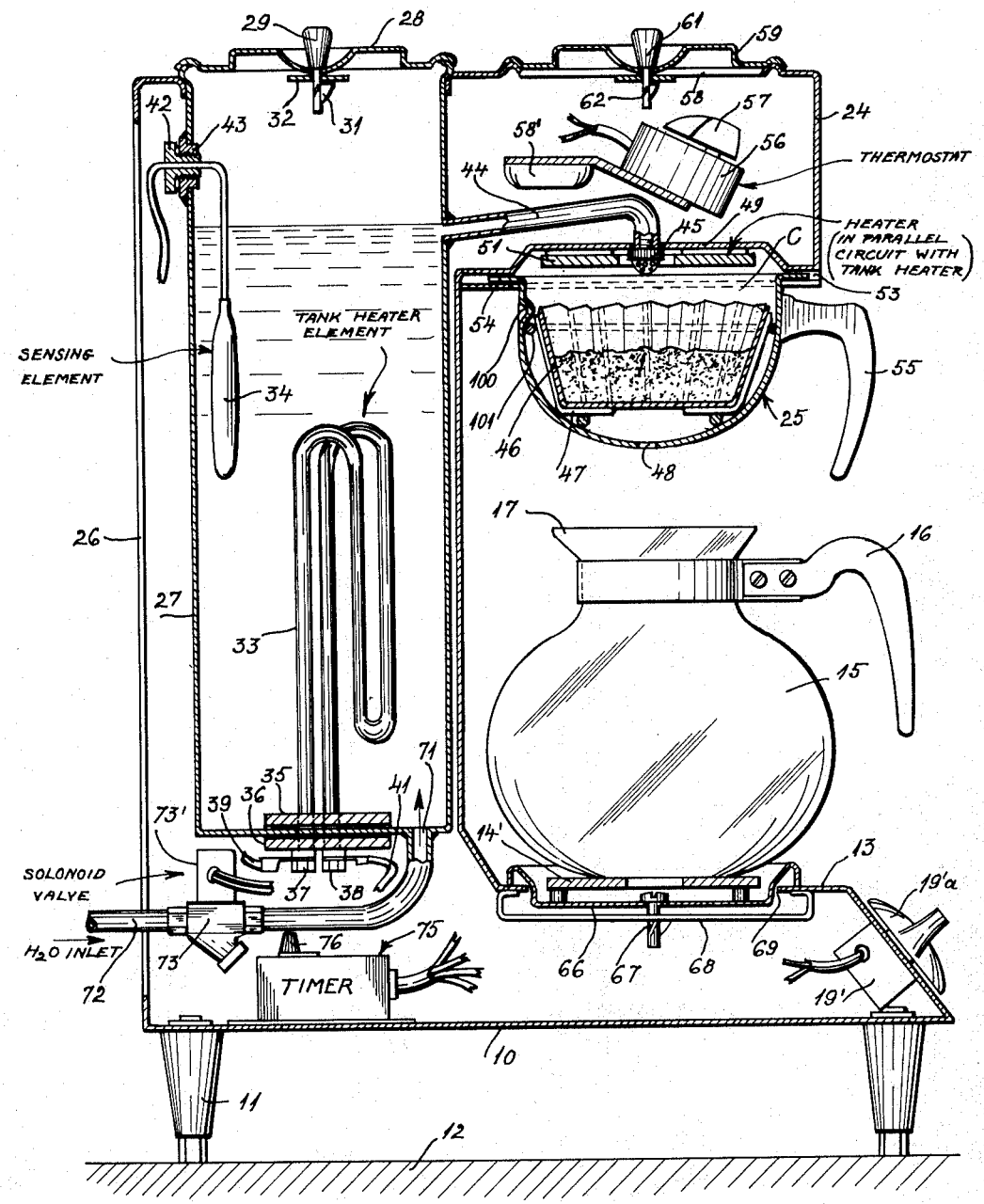
FIG. 3 is an enlarged vertical sectional view of the coffee making machine as viewed on line 3—3 of FIG. 1 and showing the filter bowl funnel in place and a coffee receiving beaker in place thereunder on its heater.
Figure 4:
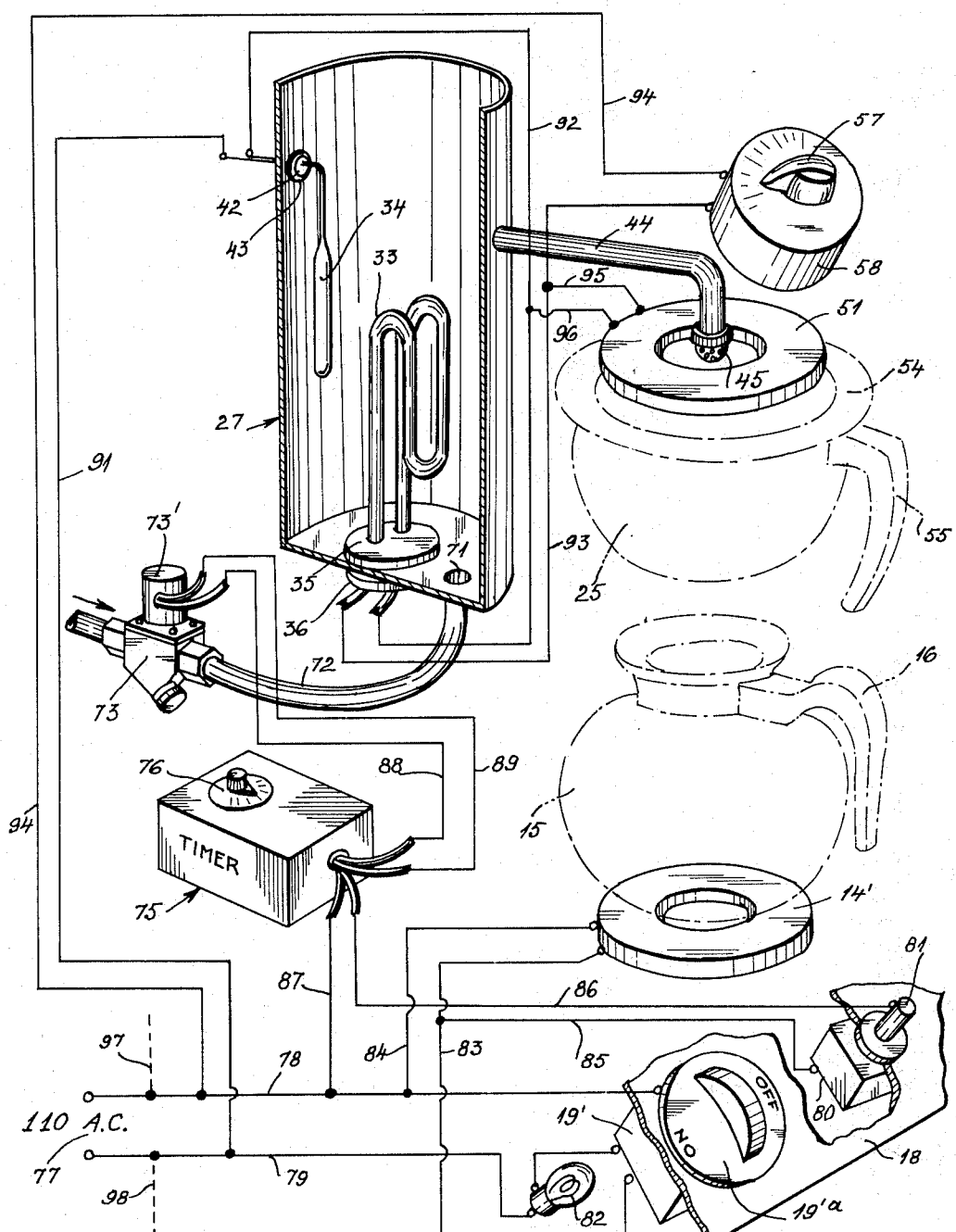
FIG. 4 is a skeletonized view of the several functional parts of the machine and the electric wiring therefor.

Referring now particularly to the drawings, 10 represents a bottom casing or base portion having four legs 11 depending therefrom for the support of the machine above a table surface 12 and to allow for free access for the hand so that the surface 12 may be easily kept clean under the coffee machine. This base portion has a front top surface 13 on which are disposed beaker heating elements 14, 14', three in number for supporting a coffee collecting beaker 15 having the usual handle 16 clamped to the neck of the beaker and a pouring spout 17. The center heating element 14' supports and heats the beaker 15 while the coffee is being made. The other heating elements serve to support reserve or previously filled beakers 15 and easily available for use by the waitress.

The forward edge of the base portion has a downwardly inclined control dial face 18 with on and off switches 19 for controlling the heating of the heating elements 14 on the surface 13 and an intermediate switch 19' for controlling the intermediate heating element 14'. Outside switches 19" serve to control heating elements 14" that will support further reserve beakers filled with coffee or water and likewise readily available for use.

Figure 5:
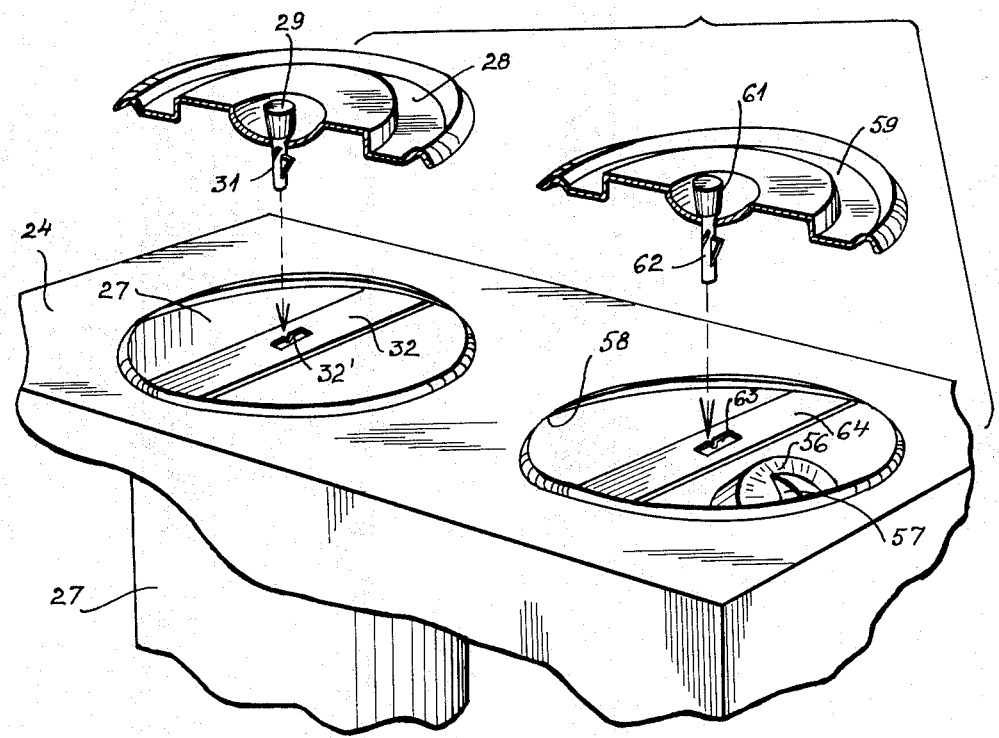
FIG. 5 is an enlarged perspective view looking upon the top of the upper portion of the machine with the covers lifted therefrom in an exploded manner, and showing how access can be had to the hot water supply tank and to the heater thermostat in the overhanging part of the upper portion of the machine.

A rearwardly-inclined face 21 extends upwardly from the lower surface 13 that provides an elevated top surface 22 on which the heating elements 14" are supported. Intermediately disposed between the heating elements 14" is an upstanding casing part 23 on the top of which there is supported a forwardly-extending casing part 24 that overhangs the front of the upstanding casing part 23 so as to removably support a bowl-shaped filter-supporting funnel 25, above the beaker 15 as it rests upon the intermediate heater element 14'. The casing parts 10, 23 and 24 are opened at the rear as indicated at 26 and the upstanding and forwardly-extending casing parts 23 house a hot water supply tank 27 that extends vertically upwardly through the top of the overhanging part 24 and is open at the top. The tank top is closed by a cover 28 that can be locked down in place by a turn knob 29 having a key projection 31 that enters a key slot 32 in a crossbar 33 in the top of the water tank, as best viewed in FIGS. 3 and 5. By removal of the cover 28 access is had to the tank 27 so that the same may be cleaned of any sediment accumulating from the water and for any replacement of tank water heating and heat sensing elements 33 and 34 provided in the tank.

The tank heater element 33 is formed of a heating rod double bent upon itself and secured to the bottom of the hot water tank by plate sealing elements 35 and 36 in the water-tight engagement with the bottom of the tank 27 with the ends of the heating elements extending therethrough to provide electric terminals 37 and 38 for the connection thereto of electric current supply wires 39 and 41. The heating sensing element 34 is in the form of a bulb and is connected to the tank wall by a threaded bushing 42 cooperating with a threaded sleeve 43 welded in the tank wall. This bulb element 34 depends from its connection with the wall of the tank into the upper portion of the water supply.

Extending forwardly from the front of the tank to the center is a hot water spray nozzle delivery pipe 44 bent down and having a spray head 45 through which water is expelled by gravity as it accumulates in the hot water tank 27 to overflow through the pipe 44 and be sprayed through its head upon a batch C of ground coffee lying within a disposable cup-shaped paper filter 46 in the funnel 25 and that is removed from the funnel 25 after each coffee batch is made into coffee. The filter paper 46 is of fluted cup shape and rests on a wire basket 47 that is releasably retained in the bowl-shaped funnel 25 and so as to keep the filter paper away from the inner surface of the bowl-shaped funnel 25 and allow the coffee liquid to pass freely through the filter paper 46 and having been made from the hot water sprayed over the entire top surface of the coffee batch C and drained through the coffee batch and the filter paper and through a bottom opening 48 in the funnel 25 and into the beaker 15 resting upon the pre-heated hot plate 14'.

The bottom of the overhanging end of the top housing part 24 is closed by an upwardly depressed portion 49 through the center of which the nozzle 44 extends. Supported from this portion 49 is a hot plate 51 of any shape that surrounds the nozzle spray head 45 so that the sprayed water and the coffee batch C are kept hot while the water penetrates the coffee batch C and the filter 46 to make the coffee and thereby insuring the full extraction of the coffee flavor from the batch. This heating element 51 is of a radiant type and as will be later explained in parallel circuit relationship with the tank heater element 33.

Depending from the opposite sides of the overhanging end of the forwardly-extending casing part 24 are opposed guideways 52 and 53 serving to slidably support the bowl-shaped funnel 25 by its annular laterally-extending flange 54. The bowl-shaped funnel 25 has a handle 55 by which it can be withdrawn from the guideways 52 and 53 for the purpose of dumping the filter and its coffee batch contents and then returned with a new filter and coffee batch to make up the next beaker full of coffee, the previously made up beaker of coffee having been placed on one of the reserve hot plates 14 and 14''.

An adjustable thermostat 56 having a turn knob 57 is supported on member 58' within the forward end of the overhang portion 24 and serving to operate with the sensing element 34 in a manner to be described to control the temperature of the hot water within the hot water supply tank 27.

In the top of the casing part 24 is an opening 58 that is closed by a cover 59 held in place by a turn knob 61 with a key 62 and a transverse member 64 on the part 24 underlying the opening 58. By removal of the cover 59, access can be had through the opening 58 with the thermostat 56 to turn its knob 57 for setting the temperature for which the hot water is to be maintained in the tank 27.

The hot plates 14, 14' and 14'' are carried on annular support members 66, FIG. 3, each of which is secured by a screw key 67 extending through the center of the plate 67 and locks with a transverse member 68 extending across the underside of the plate opening 69 in the top surface S of the bottom casing part 10 and fixed to the part.

The bottom of the water supply tank 27 has an inlet opening 71 for the supply of fresh water from a pipe line 72 leading through the opening 26 at the rear of the machine and having a time-controlled solenoid valve 73 for control of the cold water supply to the hot water tank 27. When the solenoid valve 73 is opened a supply of fresh water is delivered to the bottom of the tank 27 and the hot water in the upper part thereof is drained automatically through the spray head pipe 44 and distributed by the spray head 45 onto the coffee batch C lying within the bowl-shaped funnel 25.

Lying at the base casing part 10 and accessible through the opening 26 at the rear of the machine is an adjustable timer device 75 having a turn knob 76 that can be turned to set the time in which the solenoid valve 73 is permitted to remain open to supply the required amount of fresh water to replace hot water sprayed upon coffee batch C and enough to fill the beaker 15 with hot coffee, the hot water having been continually kept hot by the heating element 33 and at a temperature determined by the sensing element 34 and the setting of the thermostat 56.

To start the operation of the machine after a coffee batch C has been placed in the filter cup 46 and the funnel 25 disposed upon the overhang end of the casing part 24, the switch 19' is turned from an "OFF" position to the "ON" position for the annular heating element 14' under the beaker 15 so that the beaker 15 will be immediately warmed, the same resting upon the intermediate heating plate 14'. The switch 19' when turned to the "ON" position connects a 110-volt alternating current source indicated at 77 by power wires 78 and 79 to a time-delay starting set switch 80 having a press button 81 that must be depressed before the coffee making cycle of the machine will be started. Upon turning this switch 19' to a warmer position, an indicating lamp 82 in series in line 79 is turned on from the power source and through wires 83 and 84, the hot plate 14' for the beaker 15 is turned on so that the beaker will be heated preparatory to starting of the coffee making cycle. In so doing, the starting switch 80 is put into circuit connection with the switch 19' through a wire 85 and when the press button 81 of the switch 80 is depressed current will flow through a wire 86 to timer 75 that is grounded to the main circuit wire 78 by a wire 87. The starting switch 80 remains closed until the timer 75 passes through its cycle.

The timer 75 is thus put into operation and continues depending upon the setting of its adjusting knob 76 and at the same time through its wires 88 and 89 furnishes power to energize solenoid 73' to open the valve 73 and to allow the fresh water to be delivered to the bottom of the heated water supply tank 27 through the supply pipe 72 and inlet opening 71 at the bottom of the tank. The already hot water in the tank 27 is thus caused to rise and overflow into the pipe 44 and spray head 45 and upon the coffee batch C in the filter 46 and funnel 25.

The entering cold water actuates the sensing element 34 within the tank 27 as the temperature may tend to drop to give impulse to the thermostat 56 to start up the tank heating element 33 and also the radiating heat element 51 overlying the top of the coffee batch and surrounding the spray head 45. The sensing element 34 is connected from source wire 79 to a wire 91 and with the rod heating element 33 within the tank 27 by a wire 92. The heating element 33 is thus in series with the sensing element 34 and is connected through a wire 93 with the thermostat 56. From the thermostat 56 the circuit is closed by a wire 94 connecting with source wire 78. The batch heating element 51 is connected through wires 95 and 96 into parallel circuit relationship with the tank heater element 33 and is accordingly controlled therewith by the sensing element 34 and the thermostat 56.

The heating switches 19 and 19'' for the respective hot plates 14 and 14'' are independent of the starting switch 19' and the heating plate 14' and can be turned on and off as desired. The power is obtained for these hot plates through individual connections 97 and 98 to the source wires 78 and 79, and the individual heater circuit including a switch 19 or 19'' and a heater plate 14 or 14''. All the heater plates can thus be separately turned on or off as desired. The coffee machine can be connected to any wall receptacle by its plug 99, FIG. 1, and the pipe 72 is connected to any water line source, this being all that is necessary to initially install the coffee machine on location.

The coffee making cycle is completed when the time has run out with the timer 75 to close again the solenoid valve 73 thereby cutting off the flow of cold water into the tank 27. This timer has thus permitted a measured amount of water to be delivered to the tank that will replace the hot water delivered to the coffee batch and equivalent to the contents in the coffee beaker 15. As the timer 75 shuts off the valve 73 and the water ceases to flow from the tank 27 through the spray head 45 over the coffee batch C, a little time will lapse before this hot water has passed through the coffee batch C and the beaker 15 finally filled with the coffee.

Thereafter, the beaker 15 can be lifted from the hot plate 14′ and placed on any one of the hot plates 14 or 14″ and another beaker 15 placed on the hot plate 14′ preparatory to the starting of another cycle of operation. It is only necessary that push button 81 of the time delay switch 80 must again be depressed for the next cycle of operation if the switch 19′ has been permitted to remain "ON." If the switch 19′ has been turned off after the first cycle it would again have to be turned on in order that there would again be a preheating of the hot plate 14′ and of the beaker 15 prior to the starting of the next coffee making cycle.

Figure 6:
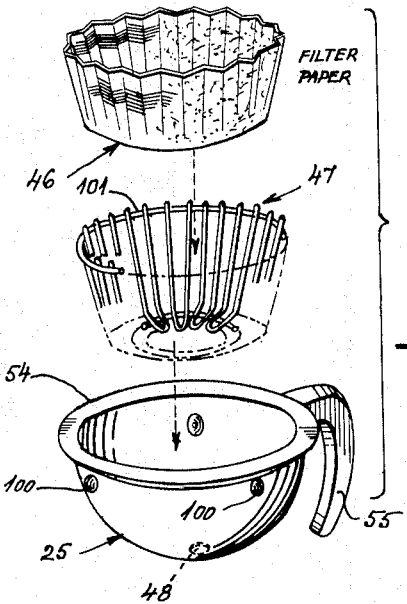
FIG. 6 is an exploded and perspective view of the coffee batch filter, and the wire basket and removable bowl-shaped funnel that supports the filter.

After the coffee has been made and the beaker 15 filled therewith, the bowl-shaped funnel 25 is removed from the overhanging end of the top casing part 24 and guideways 52 and 53 by grasping the handle 55 thereof and pulling the same outwardly as illustrated in FIG. 2. Thus, the bowl-shaped funnel 25 and the wire basket 47 can be retained together by the inwardly depressed projections 100 in the funnel 25, FIG. 6, while the basket paper filter 46 with the used coffee batch therein can be dumped therefrom into a collection vessel therefor. The funnel 25 and the wire basket 47 are then rinsed with clean water and another filter paper 46 will be inserted therein to receive another batch of coffee and preparatory to the next cycle of operation. The funnel 25 and basket 47 are returned with the new filter paper 46 into the guideways 52 and 53 onto the overhanging end of the top casing part 24 of the machine. Thereafter, the push button 81 can be depressed to start the next cycle of operation.

It will now be apparent that there has been provided a hot water supply system for a coffee making machine which does not require that the hot water tank be placed under pressure to effect supply of the hot water to the spray head thereby making for the safe handling of the hot water and need for less operating parts, the water merely being overflowed and delivered by gravity to spray the coffee batch and the top of the tank being closed only by a non-sealable cover 28.

It should be further apparent that there has been provided a radiant heating element surrounding the hot water spray head to maintain the temperature of the water after it has been sprayed upon the coffee batch still remaining on top of the filter paper and so as to insure the maximum saturation of the coffee with the water and the making of the best coffee. This heating element 51 overlying the coffee batch is controlled through the same circuit as the water heater element 33 is controlled thereby adding no complication of circuitry to the machine.

It should be further apparent that there has been provided an effective arrangement to make sure that the breaker 15 will be preheated period to the receiving of the hot coffee therein and thereby to minimize breakage of breakers due to quick temperature change.

While we have illustrated and described the preferred embodiment of our invention, it is to be understood that we do not limit ourselves to the precise construction herein disclosed and that various changes and modifications may be made within the scope of the invention as defined in the appended claim.

Having thus described our invention, what we claim as new, and desire to secure by United States Letters Patent is:

An automatic coffee making machine comprising a base, upright and top overhanging casing parts, a hot plate disposed on the base and adapted to support a coffee beaker to be filled with coffee, a hot water supply tank within said casing parts and being open at the top thereof, a pipe for supplying cold water to the bottom of the tank, said hot water supply tank having a solenoid-operated valve, a heater element for heating the water in the hot water supply tank, an overflow delivery pipe and spray head extending from the upper portion of the tank, a funnel removably connected to the overhanging end of the top casing part and adapted to contain a paper filter and batch of coffee, said funnel when supported on the overhanging end of the top casing part being vertically aligned with the coffee beaker resting upon the hot plate, said funnel being open at the top, and adjustable timer device connected to the solenoid-operated valve to control the operation thereof, electric switch means on one of the casing parts to start the operation of the timing device whereby a measured amount of fresh water will be delivered to said hot water tank to replace this same amount of hot water delivered through the spray head and over the coffee batch upon the running of the machine, and an independent electric supply means for current to the tank heater element including a heat sensing element within said tank and an adjustable thermostat device to turn on and off electric current for the heating element within the supply tank and thereby maintain a constant supply of hot water within the supply tank, and a radiant heating element disposed upon the underside of the overhanging end of the top casing part surrounding the spray head and over the open top of the funnel to add heat to the water after it has been sprayed upon the coffee batch within the funnel and to add heat to the batch of coffee, said spray head heating element being connected in parallel relationship with the tank heater element and being controlled by the electric supply means thereof.

References Cited by the Examiner

UNITED STATES PATENTS

| | | | |
|---|---|---|---|
| 2,551,219 | 5/1951 | Peters et al. | 99—282 |
| 2,568,840 | 9/1951 | Zees | 99—291 X |
| 2,737,880 | 3/1956 | Johnson | 99—282 X |
| 3,034,417 | 5/1962 | Bunn | 99—283 |
| 3,050,921 | 8/1962 | Seyfried | 220—55 X |
| 3,100,434 | 8/1963 | Bunn | 99—282 |

WALTER A. SCHEEL, *Primary Examiner.*

STANLEY P. FISHER, *Assistant Examiner.*